United States Patent [19]

Eickmann

[11] Patent Number: 4,488,692
[45] Date of Patent: Dec. 18, 1984

[54] VEHICLE WITH PROPELLER-PAIRS AND AUTOMATIC SYNCHRONIZATION WITH POWER DIVISION

[76] Inventor: Karl Eickmann, 2420 Isshiki, Hayama-machi, Kanagawa-ken, Japan

[21] Appl. No.: 330,751

[22] Filed: Dec. 14, 1981

Related U.S. Application Data

[60] Division of Ser. No. 110,157, Jan. 7, 1980, , Ser. No. 954,555, Oct. 25, 1978, Pat. No. 4,358,078, and Ser. No. 973,780, Dec. 27, 1978, , which is a continuation-in-part of Ser. No. 760,006, Jan. 17, 1977, , which is a continuation-in-part of Ser. No. 104,676, Mar. 8, 1971, Pat. No. 3,823,898, said Ser. No. 110,157, is a continuation-in-part of Ser. No. 895,687, Apr. 12, 1978, abandoned, which is a continuation of Ser. No. 760,006, Jan. 17, 1977, Pat. No. 4,136,845.

[51] Int. Cl.³ .............................................. B64D 31/00
[52] U.S. Cl. ........................................ 244/55; 244/60
[58] Field of Search .................. 244/12, 7, 6, 17.11, 244/17.21, 17.23, 53, 52, 55, 60, 65, 66, 73 R, 62, 63, 123; 418/22-23, 48, 210, 212; 60/404, 486

[56] References Cited

U.S. PATENT DOCUMENTS

| | | | |
|---|---|---|---|
| 1,842,055 | 1/1932 | Stout | 244/55 |
| 1,939,156 | 12/1933 | Wright | 244/53 R |
| 1,988,213 | 1/1935 | Ott | 418/22 |
| 2,349,286 | 5/1944 | Kreitner et al. | 244/65 |
| 2,360,433 | 10/1944 | Magwider | 244/123 |
| 2,708,081 | 5/1955 | Dobson | 244/7 C |
| 2,760,738 | 8/1956 | Robertson | 244/65 |
| 2,903,248 | 9/1959 | Walker | 244/DIG. 3 |
| 2,969,935 | 1/1961 | Price | 244/7 C |
| 2,988,152 | 6/1961 | Katzenberger et al. | 244/123 |
| 3,153,384 | 10/1964 | Castle, Jr. et al. | 418/22 |
| 3,181,810 | 5/1965 | Olsun | 244/66 |
| 3,279,172 | 10/1966 | Kudo et al. | 60/484 |
| 3,312,426 | 4/1967 | Fowler | 244/60 |
| 3,582,021 | 6/1971 | Pender | 244/7 A |
| 3,614,029 | 10/1971 | Eickmann | 244/60 |
| 3,790,105 | 2/1974 | Eickmann | 244/53 R |
| 3,823,898 | 7/1974 | Eickmann | 244/55 |
| 3,884,431 | 5/1975 | Borrell | 244/7 C |

FOREIGN PATENT DOCUMENTS

| | | | |
|---|---|---|---|
| 873563 | 2/1939 | France | 244/55 |
| 54807 | 8/1950 | France | 244/7 R |

Primary Examiner—Galen L. Barefoot

[57] ABSTRACT

A vehicle like an aircraft or ship uses multiple propeller pairs to drive the vehicle. One propeller of each pair is located on one side of the vehicle and the other propeller of the same propeller pair on the other side of the vehicle. The propellers of each pair may revolve in opposite directions. A hydraulic transmission transfers the power from the power plant to the propellers, which are driven by hydraulic fluid motors of the transmission. The transmission forces each propeller of the same pair of propellers to revolve with equal rotary velocity relatively to the other propeller of the same pair. Propellers of different pairs have different pitches or sizes. Thereby the propellers use different powers at different speeds of the vehicle. Since the power plant drives a common transmission, the power supply to one of the pairs varies compared to the power supply to the other pair, when the vehicle travels at another speed. The variation of the rate of power supplied to the different propeller pairs varies automatically in such a way that the vehicle runs at different speeds with good efficiency because each propeller pair receives a suitable portion of power at the respective speed of the vehicle.

2 Claims, 15 Drawing Figures

VEHICLE WITH PROPELLER-PAIRS AND AUTOMATIC SYNCHRONIZATION WITH POWER DIVISION

REFERENCE TO RELATED APPLICATIONS

This is a divisional patent application of my co-pending patent application, Ser. No. 110,157, which was filed on Jan. 7th, 1980 as a continuation in part application of the that time co-pending application, Ser. No. 895,687, filed on Apr. 12, 1978 which is now abandoned.

Application Ser. No. 895,687 was a continuation in part application of my earlier application, Ser. No. 760,006, filed on Jan. 17th, 1977. Application Ser. No. 760,006 is now U.S. Pat. No. 4,136,845 and issued on Jan. 30th, 1979.

Application Ser. No. 760,006 was a continuation in part application of my still earlier application Ser. No. 104,676, filed on Mar. 8 th, 1971, now U.S. Pat. No. 3,823,898.

Application Ser. No. 104,676 itself arrived from earlier applications, which are mentioned in now granted U.S. Pat. No. 3,823,898. The eldest application therein is application Ser. No. 328,395 of Dec. 5 th, 1963, now U.S. Pat. No. 3,220,898. Another important application therein is application Ser. No. 551,023 of May 18 th, 1966, now abandoned. Priority for the equalness of rates of flow in flows to hydraulic motors which drive propellers is thereby substantiated by application Ser. No. 328,395 of Dec. 5 th, 1963 and the priority for the use of such drive to propeller vehicles forward and maintain their straight forward path by equally driven propeller pairs which one propeller of each pair on another side of the vehicle is obtained by application Ser. No. 551,023 of May 18 th, 1966.

This present application is also a divisional application of my co-pending patent applications, Ser. No. 954,555 which was filed on Oct. 25 th, 1978, now U.S. Pat. No. 4,358,078 and of the co-pending patent application, Ser. No. 973,780, which was filed on Dec. 27 th, 1978 as a continuation in part application of Ser. No. 760,006.

BACKGROUND OF THE INVENTION

A propeller consumes a certain power at stand of the vehicle, when the vehicle is not moving and it consumes another power for the creation of thrust, when the vehicle moves forward, whereby the propeller moves forward relatively to the air of the atmosphere or to the water wherein or on the vehicle moves.

The power consumed by the propeller varifies with the speed of the vehicle for any amount of desired thrust.

It was custom heretofore to use variable pitch propellers to obtain the best propeller efficiency at different speeds of the vehicle.

It was also proposed in the past to use propeller pairs of different numbers of propeller blades to drive ships by multiple propeller pairs. At those drives of ships it was also already proposed to use different pitches of the propellers to obtain a running of the ship with a minimum of vibration.

However, it was never tried to use a plurality of propeller-pairs with equal pitches of the propellers of the same pair but different pitches of the propellers of another pair and to varify automatically the power supply to the different propeller pairs in order to supply to each propeller pair the different powers for different speeds.

If however, such power division would become possible, the vehicle could be driven by propeller pairs of simple propellers with fixed-pitch, inexpensive propellers, but different pitches in different propeller pairs. And, such vehicle would then be able to run with good efficiencies at different forward speeds.

SUMMARY OF THE INVENTION

When a propeller rests relatively to the fluid, like water or air, wherein it is applied, it consumes the power:

$$N = \sqrt{S^3/2\rho F} \qquad (1)$$

But, when the propeller moves forward relatively to the fluid, it consumes the power:

$$N = 0.5 \rho C_w A V_o^3. \qquad (2)$$

In the above equations the following values are applying:

N = power i.e. in Kgm/s
S = thrust in KG.
$\rho$ = density of fluid; f.e. 0,125 Kgs$^2$/m$^4$ for air;
F = Area of propeller circle = $d^2\pi/4$ f.e. in m$^2$ with d = diameter of the propeller; for example, in m.
A = vertical projection of the propeller-blade f.e. in m$^2$.
Vo = relative velocity of the rotary speed of the propeller-blade relatively to the fluid, for example in m/s.
Cw = drag coefficient of the propeller-blade.
Vo = is $2R\pi n/60$ in m/s for R = radius of prop in m for the respective propeller area and n = RPM.

The mathematical disclosures of my earlier co-pending application Ser. No. 973,780 may now be obtained from my U.S. Pat. No. 4,387,866, which issued from the continuation application Ser. No. 229,910 of application Ser. No. 973,780, on June 14 of 1983.

Equation (2) is given in the said patent for an aircraft, or an aircraft wing. The propeller-blade is acting in the same way as an aircraft wing, when not seen in the direction of movement of the propeller's axis but seen in the direction of movement of the propeller blade relatively to the surrounding fluid. Equation (2) can therefore be applied to a propeller-blade as well as to an air craft wing. The power consumption of the propeller is then obtained by calculating and summarizing all consumed powers of all blade portions.

In equation (2) appears the drag-coefficient Cw. This coefficient depends strongly on the angle of attack of the propeller and the angle of attack is a function of the pitch of the propeller and of the forward speed of the vehicle, because with increasing forward speed of the vehicle the angle of attack decreases, when the propeller has a fixed, constant pitch.

The value of the drag coefficient Cw is commonly around 0,04 at angle of attack about zero and it rises to about 0,2 at angle of attack about 15 degrees.

The invention now considers, that the vehicle should be driven by a single power plant and said plant should drive at least two propeller pairs. Then the fact exists, that only the installed power is available for the vehicle and it can not be rised over the installed power.

The vehicle intends to fly economically at a higher forward speed, or to move at a higher forward speed. At such high forward speed the propeller pair requires a suitable angle of attack in order to obtain the best traction or thrust at the respective forward speed. The propellers to drive the vehicle at such forward speed therefore require a high pitch of the fixed propeller's constant pitch, because the forward speed requires such high angle of pitch in order to obtain the suitable angle of attack at the mentioned forward speed.

When the same propeller would be used with the so installed propeller pitch to run the vehicle with slow speed, the active angle of attack would become so high, that the power required would be so high, that the installed power would not be able any more to revolve the propeller. Because the propeller pitch for high forward speed would then give an angle of attack, probably even higher than the mentioned 15 degrees and the drag coefficient would become so high, that the engine would fail to supply enough power to revolve the propeller with enough rotary speed.

To run the vehicle effectively at start or at low speed it would, therefore, by required to give the propeller pair a smaller angle of attack in order, that the engine or power plant has enough power to spin the propellers around with enough rotary velocity.

But, when the propellers would get such a small pitch to be suitable for running the vehicle at low speed, the propellers would have too small an angle of attack at the higher forward speed, that they would not bite then any more and the craft or vehicle would then not be able any more to obtain such a high speed as the installed power could give the vehicle when it would have propellers with suitable angle of attack at the higher forward speed.

The invention solves these problems thereby, that it drives at least two propeller pairs by a transmission means between the power plant and the propellers. Hereto it adds, that the propellers of one of the pairs have another pitch than the propellers of the other propeller pair. For example, one propeller pair for a slower forward speed and the other propeller pair for a higher forward speed of the vehicle. To held the vehicle simple and inexpensive in production, the invention applies in addition a fixed ratio of transmission speed between the power plant and the propellers. Thereby the propellers of equal pairs revolve with equal rotary velocities. The rotary direction may be opposite, when the propellers of the pair are arranged on opposite sides of the vehicle.

By this solution of the invention, the novel and highly desireable effect appears, that at the lower speed one of the propeller pairs effectively bites and accelerates the vehicle forward to enter the higher speed range as quick as possible. True, the propellers of the higher-speed pair have now too high an angle of attack and they are braking the speed of the propellers or they are restricting the revolutions of them. But as soon as the higher speed range is obtained, the propellers of the higher speed range pair will bite effectively, while the propellers of the lower speed pair are now having a very small or negative angle of attack and therefore now, in the higher speed range consume only little power.

The novel and highly effective solution of the invention now is, that gradually with increase of the forward speed of the vehicle, more and more of the power goes to the higher speed range propeller pair. Or, in other words, during the accelleration procedure of the vehicle the portions of power supplied to the propeller pairs change or vary relatively to each other. The power portion transfered to the higher speed range propeller pair increases with increase of forward speed of the vehicle relatively to the power portion supplied to the lower speed propeller pair.

Thus, the power available is stepplessly variable between the propeller pairs depending on the forward motion speed of the vehicle. The power is automatically and without any pilot-action or driver-action more and more supplied to the higher speed propeller pair, when the speed of the vehicle increases.

The total installation of power to the vehicle of the invention is thereby less than would be required, when the vehicle would run with propellers with equal pitch only, or when each propeller would have an individual power plant.

Due to another object of the invention, the transmission is a multiflow fluid drive of individual flows which enforces equal rotary velocities in equal propeller pairs.

Another object of the invention is, to make at least one pair of flows of the the fluid drive variable by application of a variable multiple flow pump in order to be able to selectively influence the power portion to be transfered to the respective propeller pair.

It is also possible to apply plural variable multi-flow pump sets in order to operate different propeller pairs at different forward speeds of the vehicle, whereby most economic propeller efficiencies of different propeller pairs can be obtained at both speed ranges, the lower and the high forward speed range. Thereby almost all available power can be transfered to the lower speed propeller pair at lower forward speed of the vehicle, while almost all of the available power can be transferred to the higher speed range propeller pair at the higher forward speed of the vehicle and in speed ranges therebetween the power can be delivered in the right proportion to one or the other or both of the installed propeller pairs.

Thus; the invention provides, for example,:

(a) A vehicle with plural propeller pairs to drive the vehicle and the individual propellers of the same propeller pair located on opposite sides of an imaginary medial vertical plane of the body of the vehicle with substantially horizontal axes of the propellers, wherein the propellers of different pairs have different fixed pitches of the propeller blades;

wherein the propellers are driven by a common power plant;

wherein a transmission is provided between said power plant and said propeller pairs to transfer the power from said power plant to the propellers of said propeller pairs, to provide equal rotary velocities of the propellers of a respective propeller pair, and, wherein said transmission divides the power portions transferred by said transmission to said propellers of said pairs variably relatively to each other at different forward speeds of the vehicle automatically in response to the different resistances of said propeller pairs at different forward speeds of said vehicle by permitting flows of rates of power from the respective transmission portion of said transmission to one of said propeller pairs to another transmission portion of said transmission to another of said propeller pairs.

(b) The vehicle of above, wherein the variation of the said power portions to said pairs acts automatically in response to the different power consumptions of the different propeller pairs at different forward speeds of the vehicle.

(c) The vehicle of above, wherein the said transmission includes at least one variable transmission portion for controlling the power portion to at least one of the propeller pairs in a pre-determined extent.

(d) The vehicle of above, wherein said vehicle includes as many variable transmission portions as there are propeller pairs and wherein each of said transmission portions transfers equal power portion-halves to each propeller of a respective propeller pair.

(e) The vehicle of above, wherein said transmission is a hydraulic transmission including multiple flow pumps and individual hydraulic motors to drive said propellers.

(f) The vehicle of (e),
wherein said transmission is also a synchronization device to maintain equal rotary velocities of the rotors of the same rotor pair;
wherein said transmission means is also a power-divison means to allow the free variation of the ratio of the rate of power to one of the rotor pairs relatively to the rate of power transferred to another rotor pair; and,
wherein the said varification of said ratio is allowed in said transmission to vary itself in response to the power consumptions of the respective rotor pairs during operation of said rotor pairs without disturbation of the maintenance of the action of said synchronization device.

(g) The vehicle of the above or defined by:

A fluid-stream driven vehicle, comprising, a body with an imaginary medial vertical plane; at least one wing extending substantially on both opposite sides of said plane; at least one pair of hydraulic fluid operated motors on portions of said vehicle; at least one pair of fluid stream creating means driven by said motors, respectively, and arranged symmetrically on opposite sides of said medial plane; at least one hydraulic fluid flow producing means having at least one pair of separate fluid-handling chamber groups of equal volumes, at least one pair of separate outlets with each one of said chamber groups connected to one outlet of said outlets, respectively, and including means for fluid-tight separation of the chambers and outlets so that fluid from an individual chamber group passes through one of said outlets only; at least one pair of displacement means associated with said fluid-handling chambers, respectively; equally acting actuator means actuating and defining the displacement volumes of said chambers, respectively, and and cooperating at equal times and in unison with said displacement means for maintaining equal movements of said displacement means so that fluid flows in said outlets at proportionate and equal rates of flow; a pair of delivery passage means connecting said outlets individually with a different one of said motors, respectively; said actuator means permanently fixed respective pair of said chamber groups to provide equal strokes of said displacement means; said motors containing fluid intaking chambers of equal number of chambers and equal volumes for equal numbers of revolutions at equal quantities of intake of flow of fluid; said motors having each at least one pair of ports; said ports of said motors of each pair of motors on opposite sides of said medial plane communicated vice-versa to said delivery passage means for revolving said motors of the respective pair of motors in opposite directions at equal rate of revolutions, whereby said stream-creating means on opposite sides of said medial plane are torque-balanced and driven at equal velocities for producing equal thrusts on both sides of said medial plane to stabilize the movement and attitude of said vehicle;

wherein said at least one pair of fluid stream creating means forms at least two pairs of propellers; one propeller of the same pair mounted symmetrically to the other propeller of the same pair relatively to said body;

wherein each of said propellers is driven by an individual hydraulic fluid motor and each said motor is communicated to an individual fluid line of said delivery passage means respectively, whereby the number of individual and separated fluid lines of said passage means are at least equal to the number of said motors;

wherein the number of said chamber groups and of said outlets is equal to the number of said motors and each outlet is singularily and exclusively communicated to a respective one of said fluid lines;

wherein said fluid lines transfer fluid-flow portions under pressure from said chamber groups to said motors;

wherein said propellers of one pair of said propellers have a first fixed-pitch of propeller blades and the said propellers of another pair of said propeller pairs have a second fixed pitch of propeller blades; wherein said first pitch and said second pitch are of different angle of inclination, one thereof having a smaller pitch and the other thereof having a stiffer pitch;

wherein one of said propeller pairs is effective at a lower forward speed of the vehicle and the other pair of said propeller pairs is effective at a higher forward speed of the vehicle in the response to said difference of said first and second pitches;

wherein said pressures in said fluid lines to different propeller pairs of said pairs of propellers are different at different forward speeds of said vehicle, whereby said fluid flow portions of said fluid lines to different propeller-pairs carry different portions of the power obtained from said power plant to different pairs of said propeller pairs, thereby dividing said power into different power portions supplied to different propeller pairs; and, wherein said power portions variate at different forward speeds of said vehicle to facilitate economic operation of said one of said propeller pairs at said lower speed and of the other pair of said propeller pairs at said higher forward speed of said vehicle.

(h) The vehicle of (g) wherein said vehicle is an aircraft, having a pair of wings extending in opposite directions from said body and one of said propeller pairs forms an inboard propeller pair and an other of said propeller pairs forms an outboard propeller pair, the pitches of the inboard propeller pair differ from those of the outboard propeller pair and said different portions of said power vary with different forward speed of said aircraft to increase the economy of the propeller-drive of said aircraft and to facility a transfer of the major portion of the said power to the propeller pair with the higher pitch of said pitches during travel of said aircraft at a higher forward speed.

(i) The vehicle of (g) wherein said hydraulic transmission includes at least one pump means with a pair of commonly adjustable variable rates of flow in at least two separated flows out of respective individual outlets which are communicated separatedly to the motors of one of said propeller pairs, whereby the power of one of said portions power portions becomes controllable for reducing the rotary velocity of one of said propeller pairs and thereby the power consumption of one of said propeller pairs to increase the power content of an other portion of said power portions to an other pair of said propeller pairs to increase the power in said other propeller pair at such range of forward speed wherein said other pair of propellers is effective in response to its respective propeller pitches.

(k) The vehicle of (g)

wherein a plurality of variable double flow pumps is included in said hydraulic transmission;

wherein each of said pumps supplies two separated flows of equal rate of flow of said fluid through separated fluid lines of said delivery passage means to the individual motors of said motors of a respective pair of said propeller pairs;

wherein each of said variable double flow pumps controls the rate of flow of fluid in the respective pair of fluid lines to the respective pair of said pair of propellers, thereby controlling the rate of power of the respective power portion transferred by said respective pump through the respective fluid lines to the respective motors and propellers of the respective propeller pair;

(l) The vehicle of (k), wherein said plurality of double flow variable double flow pumps controls the rotary revolutions of at least two propeller-pairs, wherein said plurality controls and maintains equal rotary velocities of the respective two propellers of the same propeller pair; and, wherein said plurality controls the ratio of the rotary velocities of one of the propeller pairs relatively to the rotary velocities of the other propeller pair within any range of said ratio between zero to infinite and between infinite and zero.

(m) The vehicle of (a), wherein said transmission means is also a means to synchronize the rotary velocities of rotors of the same propeller pairs and also is a power division means to define the rate of power transferred from a common power plant assembly to one of the rotor pairs in relation to another of the rotor pairs.

DESCRIPTION OF THE PREFERRED EMBODIMENTS

Figure 1:
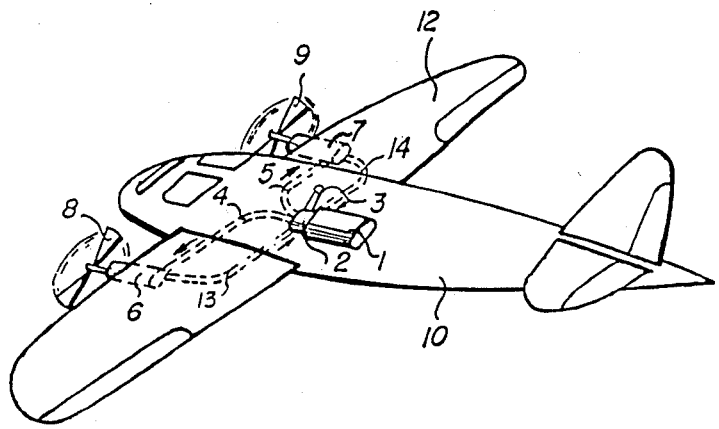
FIG. 1 is a somewhat simplified perspective view, illustrating an aircraft provided with one embodiment of the invention.

Referring firstly to FIG. 1, it will be seen that the Figure illustrates an embodiment of a hydraulically controlled fluid-stream driven aircraft which is inexpensive to manufacture, handles well and easily and is very safe in operation. The aircraft has a body 10 provided with a pair of wings 11 and 12. A fluid-flow producing means is mounted on the body 10 and includes a power plant or prime mover 1, and a multiple-flow variable pump 2 of one of the types which will be described with reference to FIGS. 3–5. The rotor of the pump 2 is driven by the prime mover 1, and produces at least two separate flows or streams of hydraulic fluid. Adjusting means 3 is provided which adjusts the fluid flows in the different streams in a sense reducing or increasing the flow, but assuring that in any case the two flows are equal to one another at all times. The flows of fluid may be varied simultaneously between a zero flow rate and the maximum flow rate. Reference numerals 4 and 5 identify fluid passages which extend from the pump 2 to respective positive-displacement fluid motors 6 and 7, which drive propellers 8 and 9, respectively. The spent fluid returns from the motors 6 and 7 via respective return conduits 13 and 14 to the pump 2.

Figure 3:
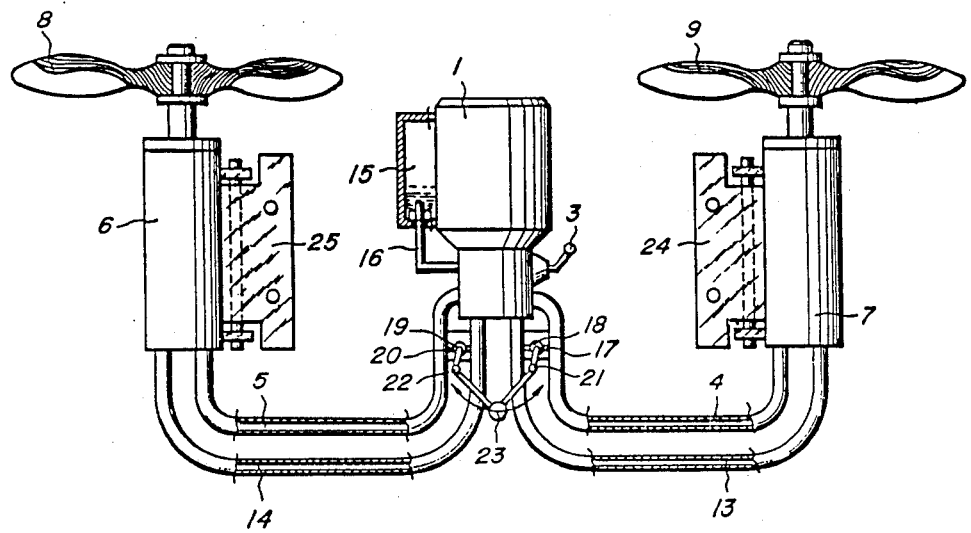
FIG. 3 is a partly sectioned view illustrating a hydrostatic power supply according to the present invention.

A hydrostatic power supply unit which can be used with advantage in the embodiment of FIG. 1, and which has in fact been diagrammatically illustrated therein, is shown in more detail in FIG. 3. It should be noted that this power unit is of a type which can be separately transported and secured to any desired craft, such as the aircraft in FIG. 1.

Like reference numerals in FIG. 3 identify the same components as in FIG. 1. Reference numeral 15 identifies a reservoir for fluid, from which the fluid flow producing means 1 receives the fluid via two lines 16 (only one shown). The fluid flow actuator means 3 acts equally in order to control the displacement volume of the displacement chambers in the fluid-flow producing means 1 (which may be of the type disclosed in FIG. 5) proportionately to each other if they change their volume. The means 3, therefore, assures that at all times at least a plurality of flows, such as a pair of flows, of equal flow rate or of proportional rate of flow travels from the fluid-flow producing means 1 separately into the fluid lines 4 and 5, to assure the proportionality of angular velocity of the propellers 8 and 9 at all times. Bypass lines 17, 18, 19, 20 may be provided between the outgoing fluid lines 4 and 5 and the respective return fluid lines 13 and 14, to enable the flow of a small fraction of fluid which flows through the delivery fluid lines 4 and 5, back into the return fluid lines 13 and 14. The by-passes may be operated separately from each other, or they may be operated in combination by an operating means 23 connected to the valves 21, 22 of the bypasses. By using the combined operating means 23, which again is to act equally and cooperate with both of the sets of in- and outgoing fluid lines, it is possible with a single operating control to change the rotary velocity of the propellers 8 and 9 relative to each other, and thus by using only a single handle to change the thrust of the fluid streams produced by the propellers 8 and 9 in any desired way.

Figure 2:
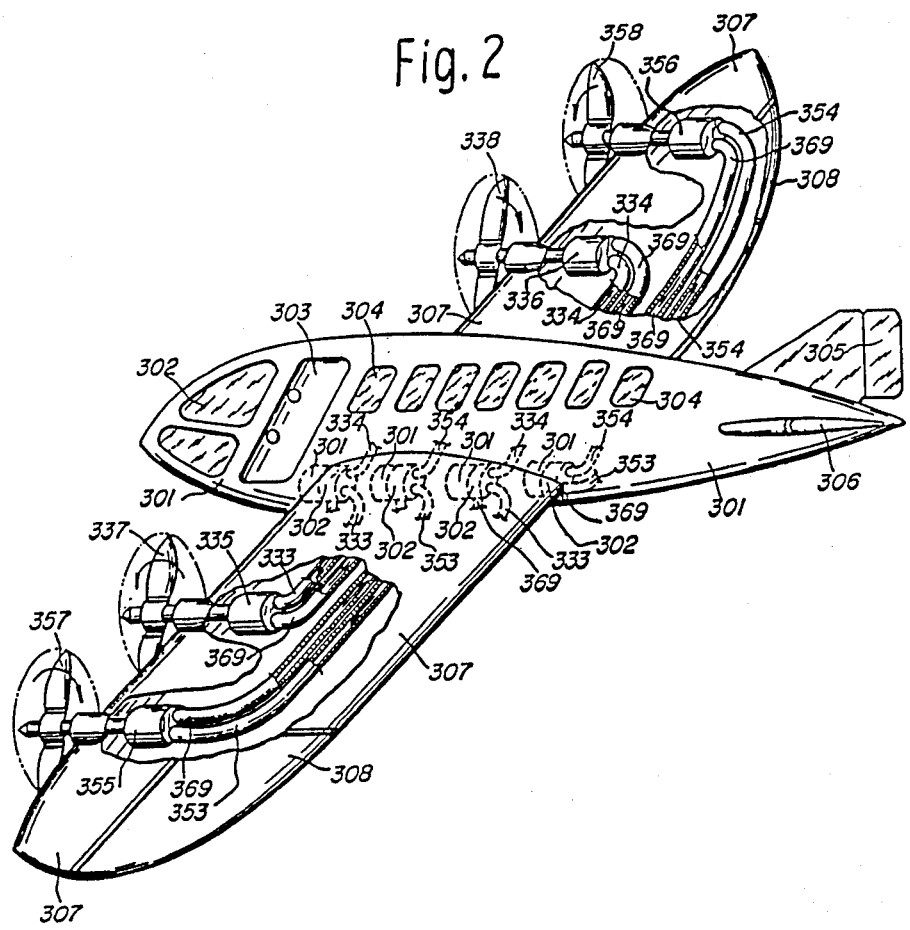
FIG. 2 is a view analogous to FIG. 1, partly broken away, but illustrating an aircraft incorporating a different embodiment of the invention.

FIG. 2 illustrates by way of example a further aircraft somewhat analogous to that of FIG. 1, but provided with a plurality of pairs of propellers, namely four propellers 336, 337, 357 and 358. Thus, for example, one set of propellers 336, 337 may be of the fixed type which cannot have the pitch of its blades changed, whereas the propellers 357 and 358 may be of the adjustable type where the pitch of the blades can be changed.

Since in FIG. 2 there are several pairs of propellers provided, the embodiment of FIG. 2 must also have several separated fluid streams of equal rate of flow. The fluid flow 333 drives the fluid motor 335 and returns via a return line 369. Fluid flow 334 drives fluid motor 338. Fluid flow 354 drives fluid motor 356. All of the fluid flows return through their respective return lines 369 directly or indirectly to the fluid flow producing means. All of the flows 333 and 334 are of equal or proportionate rate of flow. The other pair of fluid flows 353 and 354 is also separated from each other and they are also of proportionate rate of flow. A plurality of fluid-flow producing means 302 is provided, which may be driven by a plurality of power plants 301.

The relatively compact size of the fluid motors makes it possible to locate them in small spaces in the wings 307. The construction makes it possible to have the propellers 337, 336, 357, 358 rotate in opposite directions, because it is simple to reverse the direction of rotation of the fluid motor. Thus, propellers 337 and 338 may, for instance, revolve in mutually opposite directions.

The aircraft has a freight or passenger cabin 304, and an entrance 303 into the same. Cabin 302 may be provided as a pilot cabin. It should be noted that it is possible and in fact preferred to have the heavier components of the drive, such as the power plants and fluid-flow producing means, located at the bottom of the body 301 of the aircraft. Equally acting actuator means cooperate equally with all fluid-flow producing means, or rather with the displacement means in the fluid-handling chambers thereof, and this has the advantage that by means of a single control the rate of flow of fluid of all of the fluid streams can be controlled, and thereby the angular velocities of all of the propellers. Reference numerals 305 and 306 identify control rudders, and the flaps on the rings 307 are identified with reference numeral 308. Details of the construction and operation of FIGS. 1, 2, 3 and 4 are already to be found in the aforementioned copending application, the disclosure of which is incorporated herein by reference.

Figure 4:
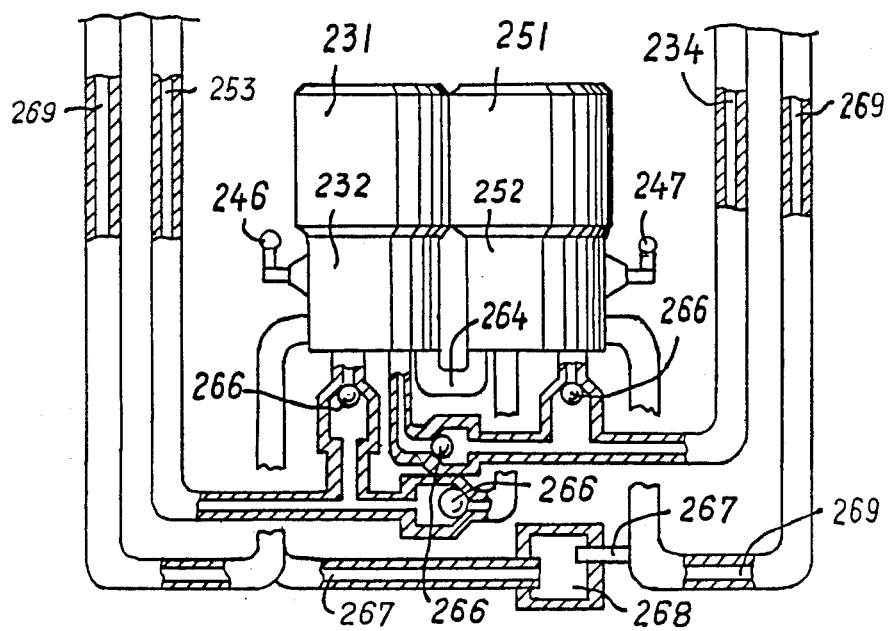
FIG. 4 is a view analogous to FIG. 3, but illustrating a further embodiment of the power supply.
Figure 13:
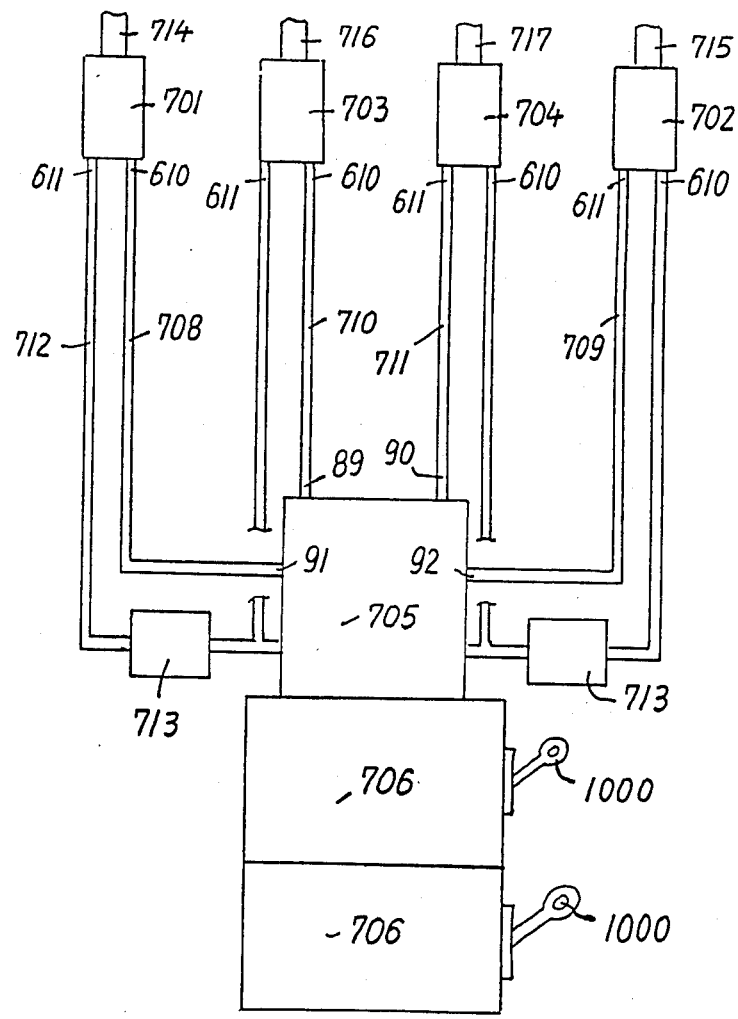
FIG. 13 shows a schematic of the connection of fluid lines.
Figure 14:
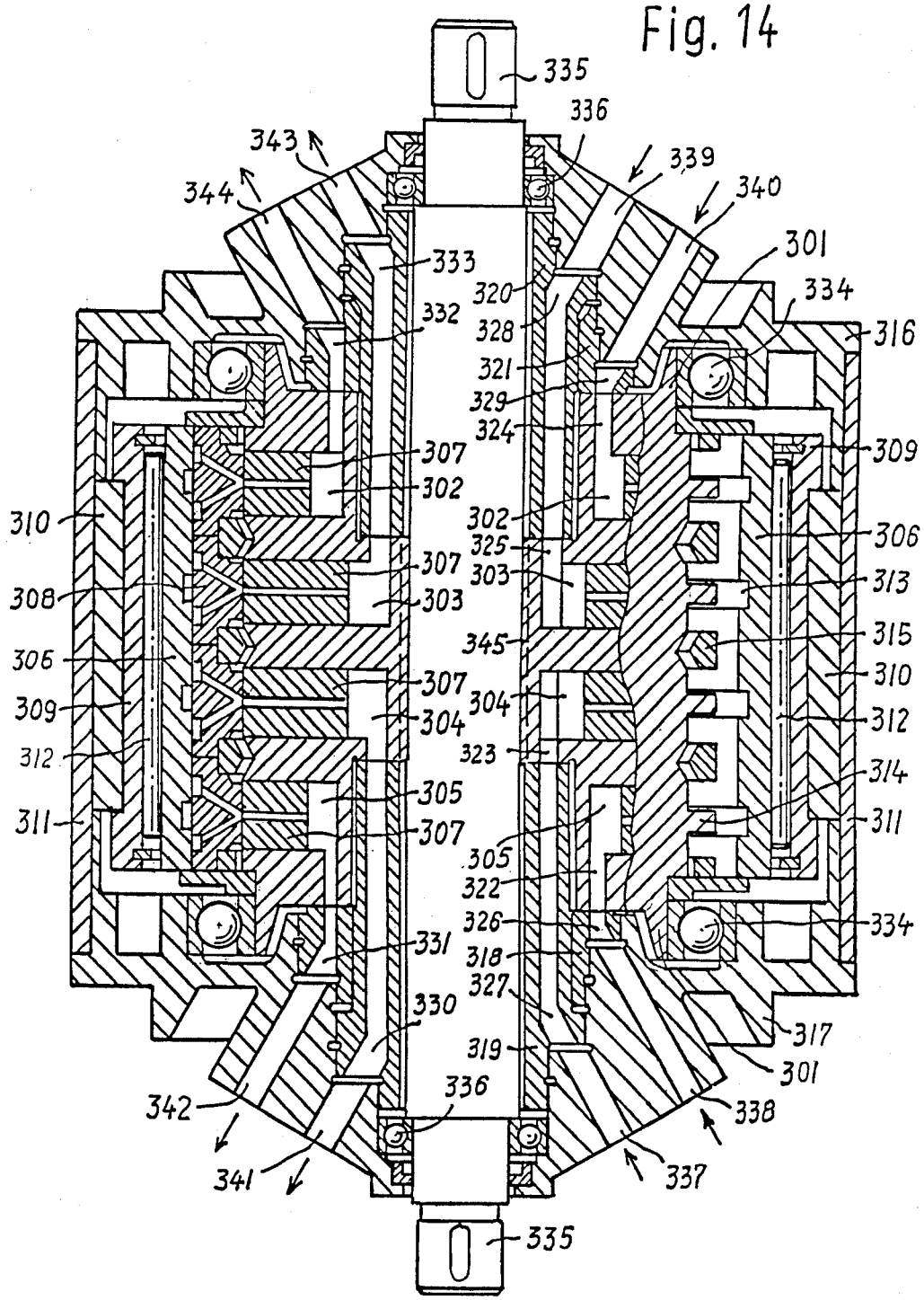
FIG. 14 is a longitudinal sectional view through a multi-flow pump.
Figure 15:
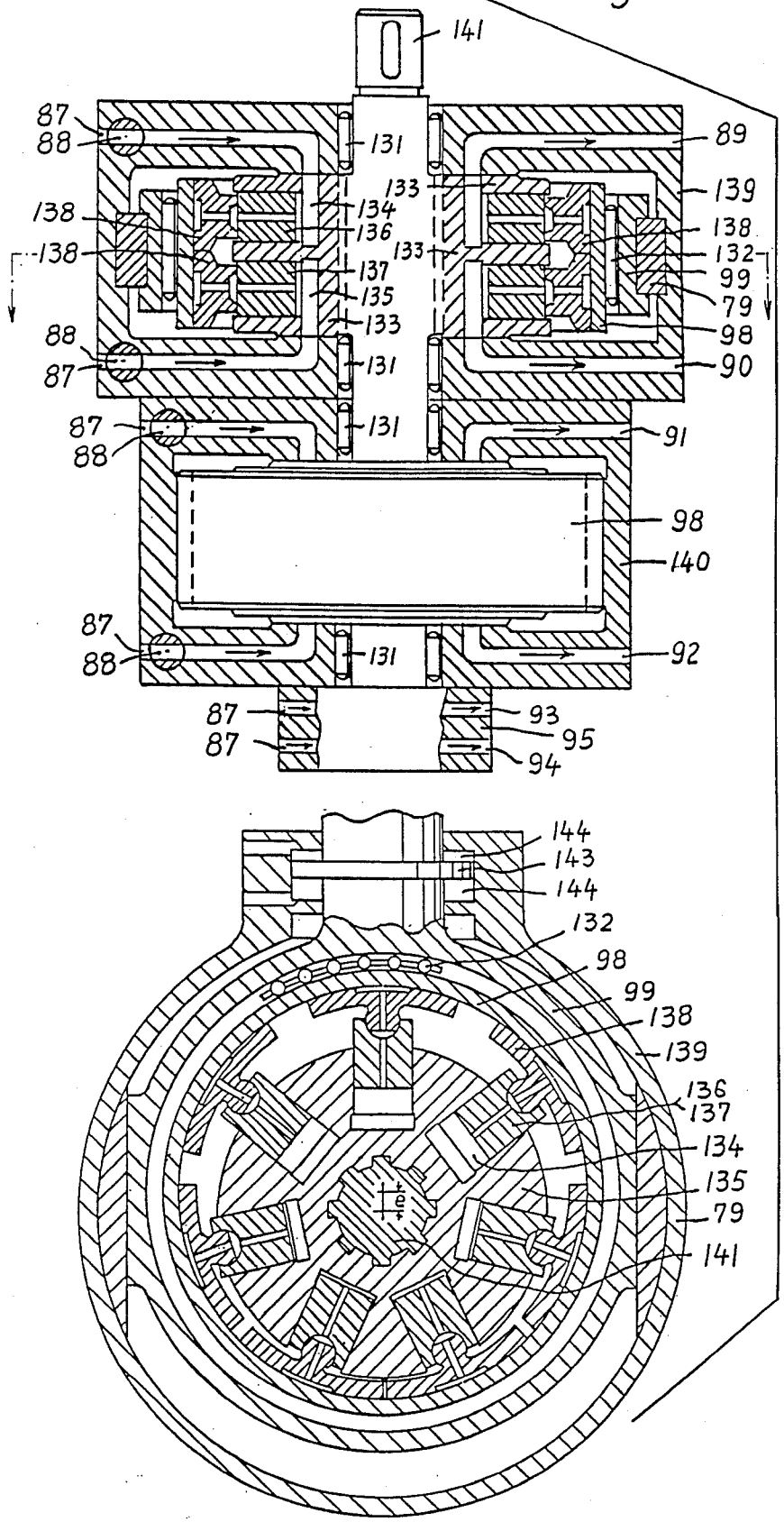
FIG. 15 is a longitudinal and cross-sectional view through an other embodiment of a multi-flow pump of one of my inventions.

The power plants and pumps 301,302 may be replaced in FIG. 2 by the arrangement of FIG. 13 with pump 705 of FIG. 13 being for example the pump of FIG. 14 or the pump of FIG. 15. As known in the art, the power plant 706 has a throttle for the control of the rotary angular speed and power output of the power plant. The rotary angular velocities of the motors 701 to 703 of FIG. 13; 335,338,355,357 of FIG. 2 and of the propellers 336,337,357 and 358 are then controlled by the throttle(s) of the power plant(s) 301. The power plant(s) 301 is(are) commonly, (a) shaft gasturbine(s) or combustion engine(s). The throttles, f.e.: 1000, are shown in FIGS. 3, 4 and 13. The aircraft of FIG. 2 has an inner propeller pair 336,337 and an outer propeller pair 337,358. Each propeller of a propeller pair is located diametrically opposite of the imaginary medial vertical plane of the vehicle relatively to the other propeller of the same propeller pair. The outer propeller pair has those propellers which are more distant from the medial plane. The propellers of the inner propeller pair are more close to the medial plane. The propellers of the same propeller pair have equal pitches, but they revalve in opposite direction. The propellers of another propeller pair have another pitch or angle of attack. The purpose of this arrangement is, that one propeller pair is effective at low speed, for example at take off and the other propeller pair is more effective at another speed, for example at high speed forward flight.

Thus, at different forward speeds of the aircraft the respective propellers of different propeller pairs are differently loaded. They consume different powers. Due to the fluid drive of this invention however, they are synchronized. That means, that each propeller of the same propeller pair has the same, but opposite, rotary angular velocity. The different angles of attack of different propeller pairs provide the mentioned different load at equal rotary velocities of propellers but at different forward flight speeds of the aircraft. The different loading of the propeller pairs results in different consumption of power of different propeller pairs. At different powers but equal revolutions the motors of different propeller pairs thereby provide different thrusts and consume or take in different pressure in the hydraulic fluid. It is the specific feature of the fluid drive arrangement of this invention, that even at equal total power the different propeller pairs can be supplied with different power and different pressures in the hydraulic fluid without departing from the velocity synchronization of the propellers of the respective propeller pairs. Because the equalness of rate of flow provides the equal rotary velocity of the propellers even when the consumed fluid pressure of the propeller motors is different.

The hydraulic driving and control arrangement illustrated in FIG. 3 is a unit which can be mounted on any type of vehicle. This unit includes a power plant driving fluid flow producing means 1 having outputs with proportional or equal delivery rates, connected to respective supply lines 4 and 5 which deliver working hydraulic fluid to respective positive displacement fluid motors 6 and 7 at proportionate or equal flow rates. Respective return lines 14 and 13 connect motors 6 and 7 to fluid flow producing means 1, which may with draw fluid from tank or reservoir 15 through line 16 and which is preferably provided with a fluid flow adjusting means 3 effective to control the displacement value of the displacement chambers therein in proportion to each other. Control adjustment means 3 thus assures that, at all times hydraulic working fluid is supplied to the motors 6 and 7, driving propellers 8 and 9, at equal or proportionate rates of flow and in supply lines which are separate from each other.

Respective bypass lines 17 and 19, each including a respective control means 18 and 20, interconnect respective supply lines 4 and 5 to respective return lines 13 and 14. Bypass lines 17 and 19 have a very small cross-sectional area, compared to those of supply lines 4 and 5, and thus allow bypassing only a small portion or fraction of the working fluid. Control means 18 and 20 may be operated separately or may be conjointly operated through connection means 21 and 22 connected to a combined operating means 23. By using means or handle 23, it is possible to change the relative angular velocities of propellers 8 and 9 by operating only a single control handle.

The unit shown in FIG. 3 is transportable and may be mounted on any kind of vehicle by the adapting means 24 and 25, with the mounting on the vehicle being effected in a manner such that motors 6 and 7 are located symmetrically on opposite sides of the vehicle longitudinal axis. By virtue of a pivoting arrangement provided between each adapting member and the associated motor, the motors 6 and 7 can be swung into or out of the vehicle.

In FIG. 4, a plurality of fluid-flow producing means 232 and 252 are provided and actuated by power plants 231 and 251, respectively. They are connected with one another in that they may have a common return or interconnecting return fluid line 264. They may also have delivery fluid lines which transfer fluid out of a tank 268 into the respective fluid flow producing means 232 and 252, and the latter each produces at least a pair of separated fluid streams of proportionate rate of flow. One fluid stream moves out of the fluid-flow producing means 232 through a check valve 266 into the fluid line 233, and another fluid stream of proportionate rate of flow travels separately from the fluid-flow producing means 252 through check valve 266 which is associated with the latter, into the common fluid line 233.

Another flow of fluid flows from the fluid-flow producing means 233 at proportionate rate of flow through another check valve 266 into the fluid line 234, and still another flow of fluid which is also separated and of proportionate rate of flow, flows from the fluid-flow producing means 252 through an additional check valve 266 into the fluid line 234. In the event that during the operation one of the power plants 231 or 251 should fail, or if one of the fluid-flow producing means 232 or 252 should fail, then the other fluid-flow producing means would still continue to deliver at least one flow of fluid into each of the common fluid lines 233 and 234, respectively. The respective check valves 266 would prevent a return flow of fluid from the common fluid lines 233 and 234 back into the fluid-flow producing means which is not operating, so that a safe operation of the system would still be assured as long as only one of the fluid-flow producing means or power plants continues to operate.

The return fluid lines 269 may return the return flow of fluids directly or indirectly into the tank 268, or via cooling means into the tank 268, or else directly into the respective fluid-flow producing means 232 or 252, or into the passage 264. The passage 264, incidentally, may be a drain line if desired. The fluid lines 267 may be suction fluid lines, or fluid lines which deliver fluid into the fluid-flow producing means 232 or 252. It is apparent that instead of providing only two fluid-flow producing means 232 and 252, it would be possible to utilize more of them, and if necessary to utilize also more of the power plants 231 and 251, in which case the system illustrated in FIG. 2 could be obtained.

The fluid-flow producing means 232 and 252 are advantageously provided with fluid-flow adjusting means 246 and 247, so that the displacement volumes of the positive displacement chambers in the fluid-flow producing means, which change from minimum to maximum and vice versa during the operation of the fluid-flow producing means, will be proportionately adjusted so that the subtraction of the minimum volume from the maximum volume of the respective positive displacement chamber remains at all times proportionate to the respective volumes of others of the positive displacement chambers. The adjusting means 246 or 247 could be operated separately or in combination.

Figure 5:
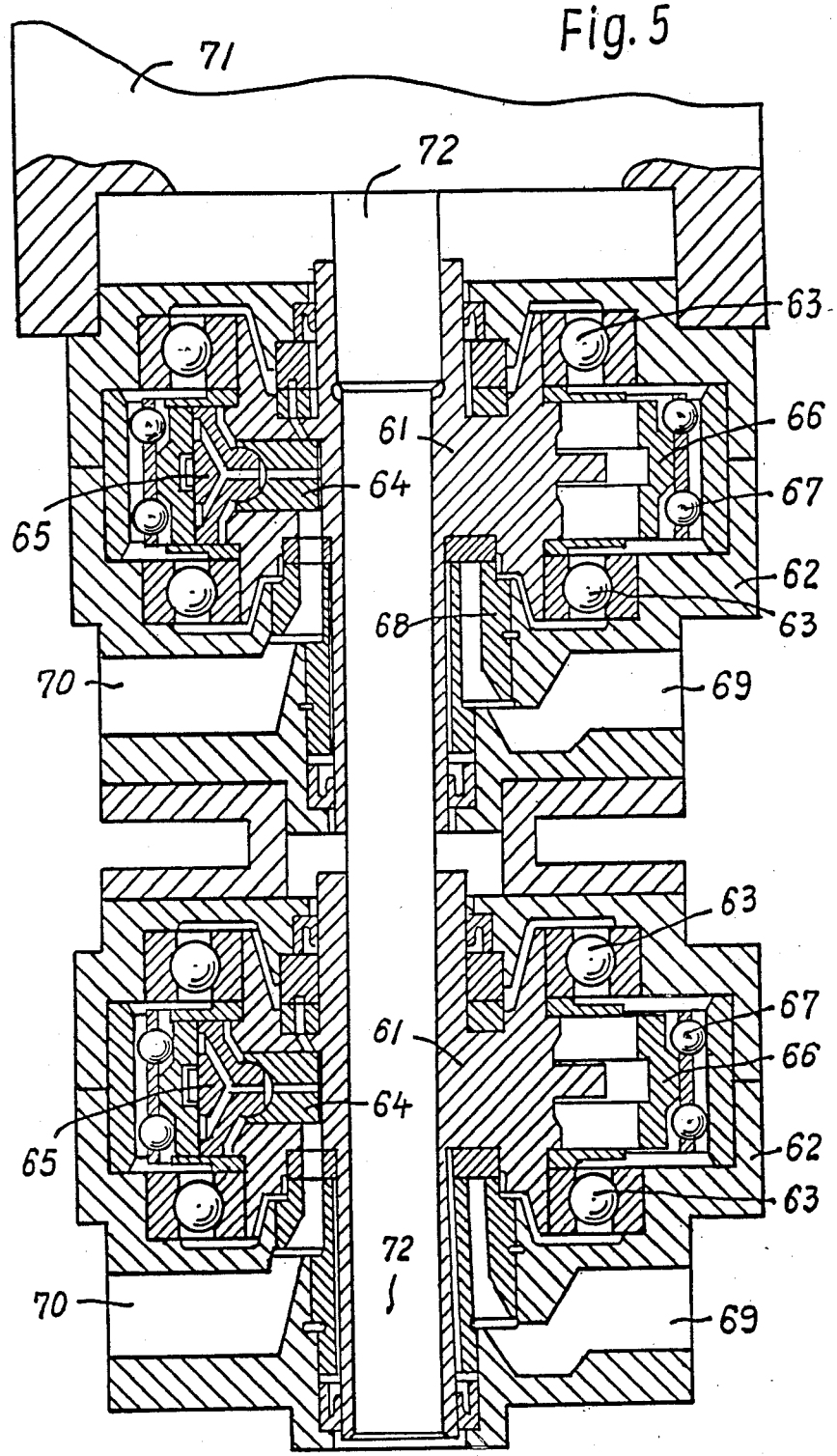
FIG. 5 is a fragmentary sectional illustration showing another embodiment of the invention.

FIG. 5 illustrates in detail how in any of the preceding embodiments equally acting actuator means may cooperate equally with the displacement means of the fluid-handling chambers of the respective fluid-flow producing means. In this Figure, reference numeral 71 identifies a power plant which drives a shaft 72 that extends through two coaxial pumps. In the pumps the rotors 61 are rotatably mounted in housings 62. Displacement means 64 serve to draw in and expel fluid with respect to the cylinders in the rotors 61. Piston shoes 65 may be associated with the displacement means 64 which are pistons, between the latter and the actuator means 66, which enforce a definite displacement or stroke of the displacement means 64 in order to actuate each fluid flow at a definite rate of flow. Antifriction bearing 63 may be provided between the rotors 61 and the housings 62, and additional antifriction bearing 67 may be provided between the actuator means 66 and the housings 62. A control member 68 may be provided to establish a fluid-tight seal between the respective rotor 61 and housing 62, and a pair of ports of which one serves for entry of fluid and one for exit of fluid is provided in each pump and communicates with the respective cylinders through passage means located in the housing and rotor and the control member, if the latter is present.

The shaft 72 drives both pumps with equal rotary velocity and may extend through both pumps, but is associated with the engine or power plant and with both of the pumps together.

The two piston stroke actuator means or actuator means 66 are so assembled, that they act equally, that is they operate equally with both pumps to assure that the rate of flow of fluid flowing out of each pump is equal to the rate of flow of fluid flowing out of the other pump. In the illustrated embodiment, the pumps are radial piston pumps, and the pistons 64 and piston shoes 65 which co-operate with the respective actuator means or piston stroke guide means 66 are so controlled by the latter that equal flow rates are assured, since in each pump the central axis of the actuator means 66 is equally spaced from the rotor-axis.

Thus, the pump of FIG. 5 is a fluid flow producing means having at least one pair of separate fluid handling chamber groups of equal volumes, at least one pair of separate outlets 70 or 69, respectively, and includes means for fluid-tight separation of the chambers and outlets so that fluid from each chamber group passes through one of said outlets only; at least one pair of displacement means 64,65 associated with the fluid handling chambers, respectively; equally acting actuator means 66 actuating and defining the displacement volumes of said chambers, respectively, and co-operating at equal times and in unison with said displacement means so that fluid flows in said outlets 70 or 69 at proportionate and equal flow rates.

Figure 12:
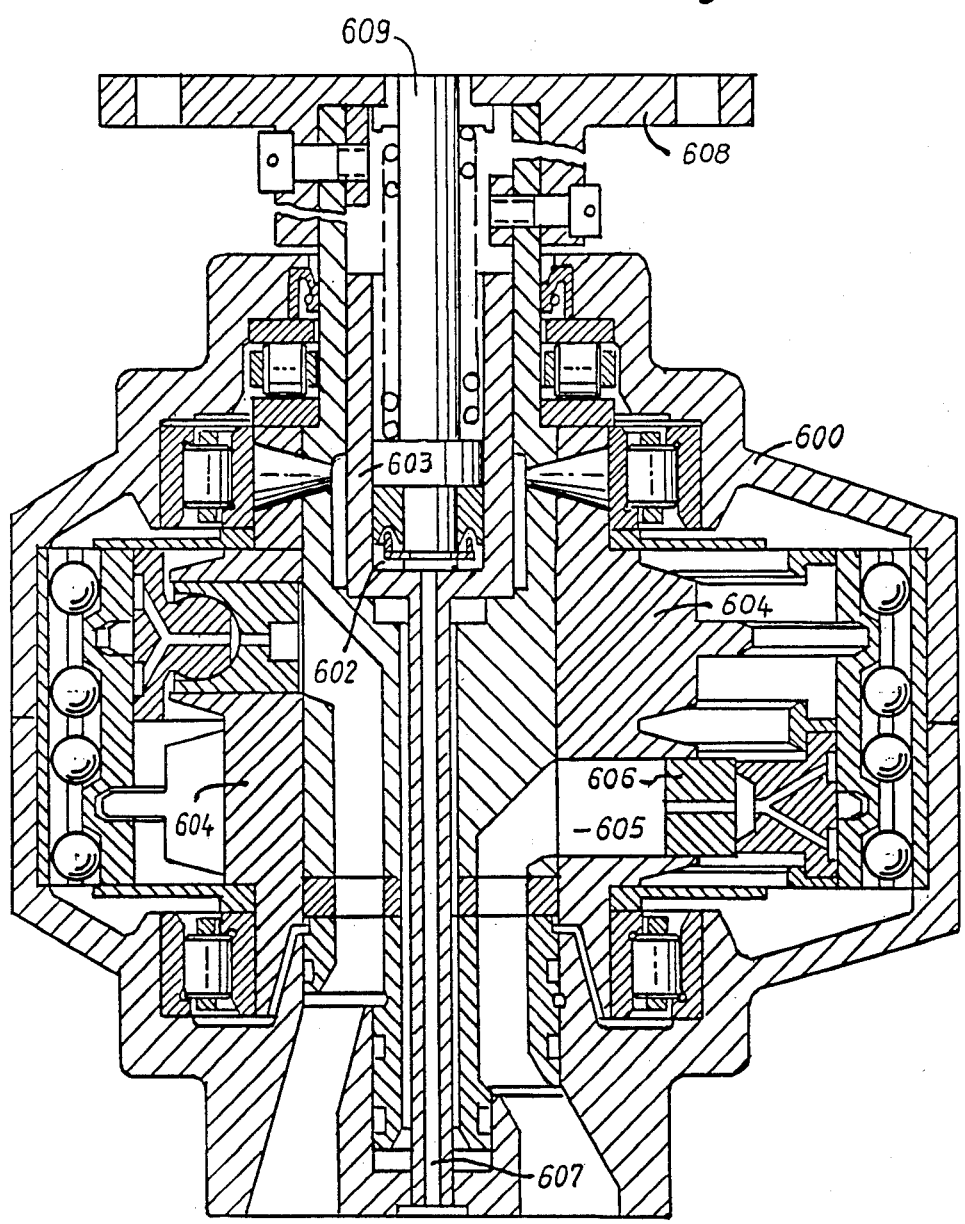
FIG. 12 is a longitudinal sectional view through an embodiment of a propeller-driving fluid motor of the invention.

One motor of FIG. 12 may for example be applied as motor 7 in FIG. 1 and another motor of FIG. 12 may also be for example applied as motor 6 in FIG. 1. A separated fluid line 5 may then be set from one of the outlets 70 or 69 of FIG. 5 to the respective entrance port of the motor of FIG. 12 which serves as motor 7 in FIG. 1. Another separated fluid line 4 may be set from the other of outlets 70 or 69 of FIG. 5 to the entrance port of the motor of FIG. 12 which acts as motor 6 in FIG. 1. Thereby the motors 6 and 7 of the vehicle of FIG. 1 are forced to revolve their shafts at equal rates of revolution preferredly in opposite rotary directions.

The pump means of FIG. 5 may also serve to drive the motors of others of the Figure. For vehicles with four motors two sets of pump assemblies of FIG. 5 may be used, or any suitable four-flow producing pump means for example that of FIG. 19 of my U.S. Pat. No. 4,171,784.

Figure 6:
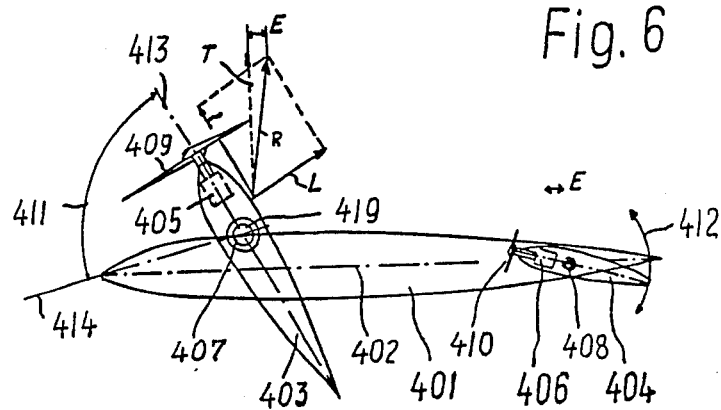
FIG. 6 is a schematic sketch of a vertical take off aircraft seen from the side having inclinable wing means and a swingable elevator-wing both with propellers borne and driven by fluid motors.

The aircraft of FIG. 6 is for vertical or horizontal flight, landing or take-off. The hydraulic motor(s) 405 of the main wing 403 drives propeller(s) 409 also in the upwards inclined position 413. The propeller(s) 409 thereby forces air with high velocity over the main wing 403. This creates a lift L on the wing 403. On the other hand the propeller 409 excerts a propeller traction S in the direction of wing axis 413. Both conmponents of forces together apply a force R onto the body of the aircraft. This force resultant R may be seen as a vertical upward force component T and a horizontally backward component E in the specific angular and forces-play as demonstrated in FIG. 6. This would result in an upwards lift and backwards tracting of the aircraft. Since however a hydraulic propeller driving motor 406 is provided before the elevator-wing 404 the propeller 410 forces air over the elevator 404. Thereby elevator 404 can also in stand or in vertical take off, when no natural flow flows over the elevator be used for control of the horizontality of the body 401 of the craft. By swinging or pivoting the elevator wing 404 around center 408 of swing the pivoting within the angular range 412 lifts or sinks the rear portion of the body 401 of the specific aircraft of FIG. 6. By this means the aircraft can be kept in any desired inclination relatively to the surface of the earth. Without the location of hydraulic motor 406 relatively to the elevator 404 and driving by said motor or motors a propeller or propellers on the elevator or relatively located to the elevator, so, that air is forced over the elevator, the aircraft would not be stable at vertical take off, landing or flight.

In addition the propeller(s) 410 of elevator 404 provides a traction onto the elevator 404 in the forward direction and of the size E. By making traction E equal to the backward component E of R the aircraft is brought into balance of forces. It now lifts vertically up without forward or backward move. The so remaining final summation of forces on the aircraft of FIG. 6 is T and is vertically upward directed. The aircraft goes vertically up or down or hovers in air.

This is an example how for practical application a one-winged aircraft can be made to take vertically off by controlling such take off by angle 411 of the wing and by providing the propeller to the elevator and by angular control of the elevator 404.

For forward flight the main wing 403 is pivoted forward towards the position 414 to come to rest either between positions 413 and 414 or in position 414.

Figure 7:
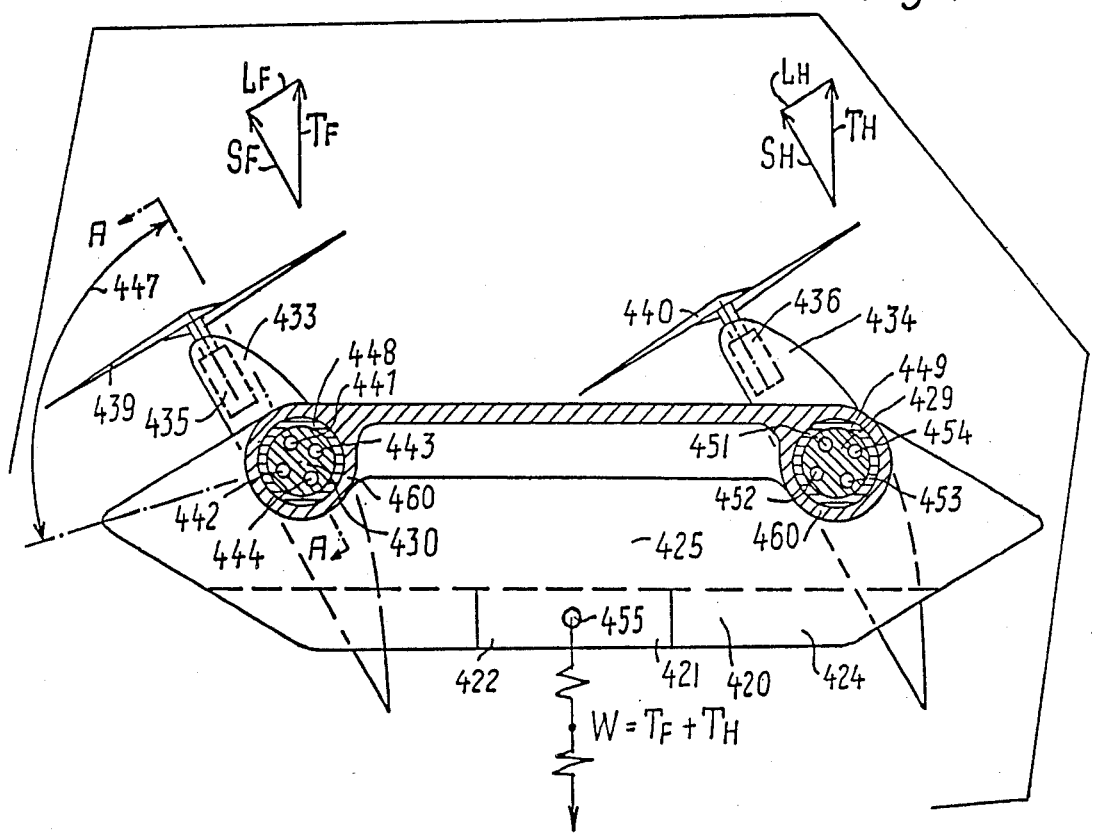
FIG. 7 shows a longitudinal sectional view through a vertical and horizontal flying or landing or take-off aircraft with swingable wings and hydraulic motors in said wings for driving propellers and whereby said longitudinal view is taken through the wings, laterally of the body of the aircraft.

In FIG. 7 a double winged aircraft is shown, having a body 420 with a heavy weight compartment 424 and a freight or passenger cabine 425. The heavy weight compartment preferrably contains the power plants, engines, pumps, 421 and 422 and other heavy material to form the weight center in the middle, but low in the body 420 of the aircraft. The body 420 is also provided with two or more wing bearings 448 and 449 wherein the main bone-structures 430,429 of the wings 433,433 can be pivoted with said wings at an angular intervall 447. The main bar or main bone of the wings may contain fluid lines 442,443,444,441, 451,452,453,454 to fluid motors 435,436 for driving the said motors and thereby the propellers 439,440 which are associated to said fluid motors. Said fluid lines communicate respective chambergroups of respective pump means with respective fluid motors.

The propellers 439,440 force air with high velocity over the wings 433,434. The profile of said wings then provides a wing-lift L which is named LF for the front wing and LH for the rear wing. The direction of said wing lifts LF and LH is however not upwards, but upwards to the rear as shown in the component arrow diagram of the Figure when the wings have the angular pivot-position as shown in the Figure. At same time the propellers 435,440 provide a traction S in the direction of the axis of propeller and fluid motor. Front traction is cited by SF and rear traction of a propeller is cited by SH. The component of the forces diagramm shows, that these forces SF plus LF summarize to the upward directed front force TF and at the rear of the craft the forces SH and LH summarize to the upward force TH. Both forces TF and TH are upwards directed, parallel to each other and equally distanced from the center of the craft. The weight W is downward directed from center 455. Forces TF plus TH and contrary directed force W keep the aircraft in straight position. Increasing the sum TF plus TH over W brings vertical upwards movement of the aircraft. Equalizing gives hovering and decreasing of the sum TF+TH below W gives vertical sinking of the aircraft of the Figure.

For forward flight both wings 433 and 434 are downward forwardly inclined within the range of angle intervall 447 depending on the desired flight path of the craft relatively to the horizontale.

For all those aircraft which are described in this specification as vertical or horizontal flying, landing or take off aircraft it is required, that the engines, pumps and motors are of little weight but of great power. Such capabilities are not common to usual engines, pumps or motors. Suitable less weight powerful engines, pumps and fluid motors are however available by the patents of the inventor of this application. If they are used, the vertical take off and landing or otherwise horizontally flying winged aircraft becomes a comfortable reality. To use non-suitable pumps, engines, motors will however result in failure, because they may be too heavy compared to their power or too unreliable.

Figure 11:
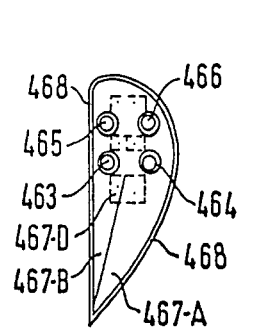
FIG. 11 is a cross-sectional view through FIG. 8 along the line XI—XI.
Figure 8:
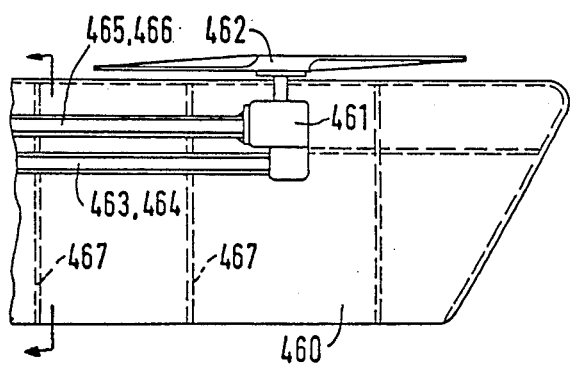
FIG. 8 is a view from above and partially sectionally through an aircraft wing or blade containing fluid lines which built or may built a part of the structure of said wing or blade and wherein said wing or blade, for example propeller blade is provided with an hydraulic or fluid motor.

In FIG. 8 and the thereto belonging sectional view, FIG. 11, a little weight wing or propeller or blade is shown, wherein the fluid lines form at least a portion of the main structure bone or bar of the said wing or blade. Two or more fluid lines, like pipes, namely 465,466,463,464 form together a holding main structure. They lead for example from a holding on the aircraft to a respective fluid motor(s) 461 for driving a thereto associated or thereby borne propeller 462. Said fluid lines can be able alone to hold and supply motor(s) 461. But in addition they may be utilized to form the wing 460 and to make the wing 460 strong and holdeable. Ribs 467 may be set around the fluid lines. In FIG. 11 they are shown as rib-portions 467-A and 467-B. Setting one of them from below and the other from up around the said fluid lines gives a strong wing-rib. They may be so configurated to keep the fluid pipes fastened between them. A medial rib-portion 467-D may be applied to rivet portions 447-A and B together to form a complete wing rib and to contain in fixed position therein two or a plurality of two or any other plurality of fluid lines or at least one fluid line. After fastening the fluid lines to the fluid motor and setting the rib portions around the fluid lines the ribs may be provided with the wing-cover 468 and said cover may be fastened to the said ribs of the wing.

The arrangement of this Figure spares the heretofore provided main bars of the wings and eliminates the weight making setting of fluid lines plug wing-structure bone-bars. The wing of these Figure is therefore especially suitable for hydraulically operated aircraft for vertical or horizontal or combined flight.

Figure 9:
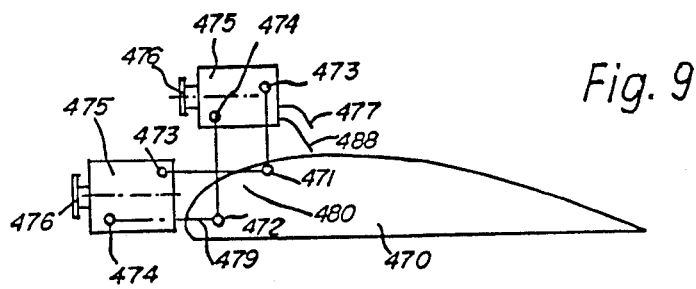
FIG. 9 is a schematic cross-sectional view through an aircraft wing whereon a swingable hydraulic propeller driving motor is mounted for swing into a position above the wing or into a position before or after the wing or into any position therebetween, if so desired.

In FIG. 9 it is shown by way of example, how a hydraulic fluid motor is associated to a wing or body. Wing 470 has holders 471 and 472 which pivotably bear or swing arms 479 and 480. These are connected by connectors 473 and 474 to propeller-driving fluid motor 475. Fluid motor 475 has a revolvable shaft 476 for holding and driving a respective propeller, the latter not shown in the figure. For starting or landing on water or on ground the propeller motor 475 is pivoted into the above wing position, the right-up in the Figure. That prevents water coming to the propellers or the propellers coming too close to the ground. In high-speed flight the location of the propeller-axis above the wing however provides a tilting moment to the craft and the forces of resistance and of traction are not in the same plane.

Therefore, according to this Figure the fluid motor is pivoted forward or backward downward into the left-shown position for acting substantially about in the center face through the wing or body. This stabilizes the craft in the air at flight. The swing of the motor from above to before or behind the wing or vice versa is possible due to flexible fluid lines or hoses 477,478.

Thus, the aircraft wing or body of the Figure is especially convenient for low-winged aircraft, for water-aircraft, motor gliders and like.

Figure 10:
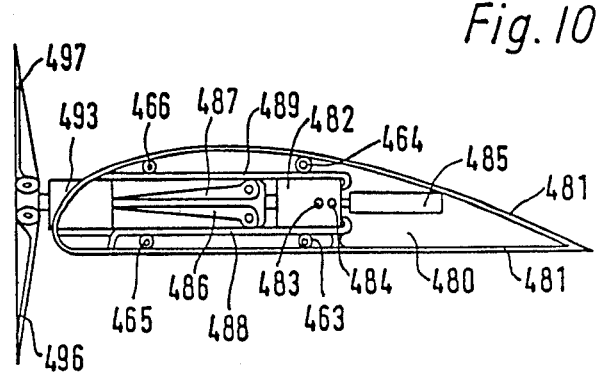
FIG. 10 is a cross-sectional view through an improved wing of an aircraft which contains a guide for a retractable propeller driving motor and wherein the propeller and motor are shown in a retracted and in an operational position.

FIG. 10 demonstrates an arrangement in an aircraft wing, which is especially attractive and useable to vertical take off aircraft or to motor gliders and like.

For vertical take off big diameter propellers or many propellers are needed. Otherwise the lifting efficiency becomes so bad, that the aircraft will not lift, if economic engines, like piston or rotary, not turbine-engines are provided.

At sailing of the glider or at high speed flight of the aircraft the propeller(s) may make too much drag to fly economical or at high speed. It is therefore desired, to tract one or more of the propeller(s) into the body or into the wing.

That is accomplished by subtracting the propeller-driving fluid motor with its associated propeller into the body or wing. And to move it out and into action again, if so desired. Wing or body 470 has guide means 488,489 for guiding or sliding the fluid motor 482. Motor 482 is once shown in the retracted position inside of the wing. It is also shown in the other position as motor 493. Operator means 485 may either tract the motor with propeller into the wing 480 or out of it into operating position. In operating position propeller arms 496 and 497 may be swung out into operating position by remote control or automatic control. In the retracted position the propeller arms 486 and 487 may be swung foward about 90 degrees to be able to form a narrow device for being retractable into the wing or even into the guide means 488,489. Fluid lines 466,465,463,464 may again, for example as in FIGS. 8,11 or 7 form the bone(s) of the wing and may hold the guide means 488,489.

The subtraction into the wing, as shown in the Figure, makes it possible to provide economically a plurality of propellers to wings and to bring them back into the wing(s) if so desired. Thus, this wing has the capability to provide an economic vertical take off aircraft for the money the average man can spend and said vertical take off aircraft will well be able to be transformed in flight to an economic high speed aircraft. For example the propeller or propeller-pair for high speed flight may be of variable pitch. The propeller or propeller-pairs for vertical take-off may be of the swing in-retractable type of FIG. 10. Flexible hoses may lead to ports 483 and/or 484 of motor 482. Closing covers may be moved over the open guide portion between 488 and 489 as seen as the propeller and its motor are retracted into the wing, so, that wing 480 is a fully closed wing with cover 481 when the motor and propeller are retracted into it.

In FIG. 12, which is a longitudinal sectional view through an example of a propeller-driving fluid motor, the housing 600 contains revolvingly borne therein the rotor 604 which has working chambers 605 for intaking fluid and driving pistons 606 in said chambers 605 for revolving the rotor 604 of the motor. The rotor of this embodiment of the invention is provided with a central bore or hub which extends also through the entire motor. A cylinder or thrust chamber 602 is provided in or on the motor and a member or piston 603 is moveable therein. It may be excerted from the other end by spring pressure. It is especially convinent to provide space 602 as a cylinder provided in the rotor hub and a piston 603 axially moveable therein. A fluidline 607 extends through at least a portion of rotor 604 to said space 602 to operate the member 603 therein by fluid pressure. Propeller flange 608 may be mounted to the shaft and rotor of the motor; and member 609 associated to member 603 may extend through propeller shaft 608 to control and drive the variable or swingable members or portions of the associated propeller.

FIG. 13 is a schematic, which shows, how in the transmission of the abstract of the disclosure the outlets of respective pumps and the inlets of respective motors, which drive the propellers of a respective propeller-pair are connected by respective fluid lines with each other for the transfer of fluid from the pump to the motors and thereby to transfer the power from the power plant to the rotors, to synchronize the rotary speed of the rotors of a rotor-pair and to divide the power into power portions to rotor pairs with a variable ratio of the rate of power to one of the pairs relatively to the rate of power in the power portions to the other pair, when the arrangement of FIG. 13 is used in a pluralpropeller-pair driven vehicle, for example of FIG. 2, and, when the forward velocity of the vehicle varies.

Power plant assembly 706 consists of one or more power plants to drive one or more pumps means 705. Means 705 may for example be the pump of FIG. 15 or 14. When it is FIG. 14's pump, it has outlets 89 to 92 with outlet pair 89,90 and an other outlet pair 91,92.

Motors 701 and 702 form a first motor pair to drive with their shafts 714,715 a first rotor-pair of a first resistance during rotation. Motors 703,704 form a second motor pair to drive with their shafts 716,717 a second rotor pair of a second resistance during rotation of the respective rotors.

The rate of flow in the outputs 91 and 92 is equalized in the pump means and transfered by separated fluid lines 708,709 to the entrance ports 610 of the respective motors 701 and 702 to revolve the motors of this pair with equal rotary velocities.

The rate of flow in outputs 89 and 90 is also equalized in the pump means and transferred by the separated fluid lines 710 and 711 to the entrance ports 610 of the motors 703 and 704 of the other motor pair to revolve the motors of this pair also with an equal rotary velocity relatively to each other.

When the rate of flow in outputs 89,90 is equal to the rate of flow in outputs 91,92, then all motors revolve with equal rotary velocity. The different resistances of the first and second resistance then define the difference of the power portions to the first and second rotor pair. The ratio of one of the power portions to the other comes from different pressures in the fluid lines to different rotor pairs because of the different first and second resistances. The ratio of the power portion to one of the pairs relatively to the power portion to an other of the pairs will change, when the first and second resistances are changing.

Return fluid lines 712 may transfer the return fluids from exit ports 611 of the motors to a tank means 713 or directly into the pump 706 depending on operation in an open or closed hydraulic circuit, or circuits.

In the embodiment of FIG. 14 a common actuator means 306 acts on the displacement members 307 of four separated fluid flow delivery chamber groupes 302,303,304,305 to deliver four separated flows of equal rate of flow in the pressure fluid out of two pairs of exit ports or outlets 341,343 and 342,344.

Two separated fluid flows of equal rate of flow can thereby be utilized to be send to a first motor pair to drive a first pair of fluid motors and thereby to drive a first pair of rotors or of propellers of a first resistance during rotation.

To other fluid flows of equal rate of flow can thereby be utilized to be send to another pair of motors to drive a second pair of rotors or propellers of a second resistance during rotation.

More details of the Figure can be obtained from FIG. 19 and the description thereof in my U.S. Pat. No. 4,171,784.

The arrangement now provides a first fraction of power of the power plant into two first power portions of a first pressure in the fluid defined by the resistance of the rotors of the first rotor pair and it provides a second fraction of power of the power plant into two second power portions of a second fraction of power of a second pressure in fluid defined by the second resistance of the second rotor pair.

When the resistances in the first and second rotor pairs are equal, the first and second power portions are equal. When the resistances of the first and second rotor pairs are different, there exists a ratio of the first power portion to the second power portion.

When said ratio varies during operation of a device, for example in different surrounding or due to different resistances of the rotor pairs at a certain speed of the arrangement, the ratio varies automatically in response to the difference of the resistances.

The pressure in the fluid lines to the first pair is then different from that to the second pair. Thus, the arrangement provides a power division means with equal power portions in power fractions to equal pairs but different power portions in power fraction to different pairs.

The pump means of FIG. 15 has a first working portion for the creation of a first pair of flows of fluid of equal rate of flow to be transferred separately out of outlets 89 and 90.

It also has a second working portion 98 for the creation of a second pair of fluid flows of equal rate of flow to be separately transfered out of the separated outlets 91 and 92.

The bottom Figure is a cross-sectional view through the portion of the top-Figure along the line IX—IX and shows, that at least one of the mentioned working bodies is provided to supply a pair of variable flows of equal rate of flow. The other working body may supply a pair of fixed flows of equal rate of flow out of outlets 91 and 92. But also this working portion could be built similar to that of the other working portion and thereby be made able to supply two variable flows of equal rate of flow too.

More details, how this pump means is operating and designed can be studied in FIGS. 8 and 9 of my U.S. Pat. No. 4,171,784.

The pump means of FIG. 15 can for example, be used, to temporary revolve both propeller pairs of FIGS. 2 and/or 6 equally and to act other times to let one of the propeller pairs run slower or faster than the other and it can also be used at other times to set one rotor pair or one of the propeller pairs to rest.

When one of the mentioned pairs is set to rest all or almost all of the power of the power plant is transferred to the other pair of rotors or propellers.

The arrangement including this Figure as pump means is thereby able to divide the power into desired power portions of rates of power at will.

The latter may be done by the incorporation of respective control means 143 of FIG. 15, which can variate the actuator 99 to varify the strokes of displacement members 136,137 of the portion of the pump inside of housing portion 140 of FIG. 15 in the way as described by FIGS. 8 and 9 of U.S. Pat. No. 4,171,784.

Thus, this device is able to perform even the most sophisiticated or the most variant ranges of the ratios of power fractions or portions of the invention.

At discussions of the invention it has become visible, that not all persons immediately understand the invention. They are commonly assuming, that a control means should be provided to control the flow of power portions. Occasionally it is also assumed, that propellers must consume more power, when they are revolving faster.

Both assumptions may be correct for conventional technology, but they are not at all times correct for the present invention and its application. Because in the invention the division of power and the variation of the power ratios occurs automatically. The only control means for the invention is the "throttle" of the power plant, which defines the speed and output of the power plant.

The gist of the invention is therefore partially also shown in the following explanation:

The gist of the invention (and main claims) is, that the variation of the rates of power to the different propeller pairs is not done by variation of the power of the power plant as a whole, but occurs automatically and depending on the forward velocity of the craft. The pilot normally does not influence this automatic power variation of the power fractions and portions going to the different propeller pairs.

To give an example of practical flight:

The pilot may have available a long runway. He is not forced to start with over power for a short runway. The pilot is conscious of the fuel consumption. His power plant may give him, for example, 100 Horsepower maximally at, for example, 5000 rpm. But he knows, that the best fuel consumption and best economic power rating of his engine is at 75 HP at 4000 RPM. Now, in order to save fuel, he intends to run his power plant in this most economic fuel consumption range.

The aircraft, which the pilot tends to fly, is an aircraft of the present invention. Thereby the pilot has one single means for control of power to his disposal. That is the throttle of his power plant. For example, a shaft-gasturbine with a pump thereon or a combustionengine with the pump thereon. He has indications on his throttle (or accelerator in cars) which indicate the setting of the power rate.

This fuel conscious pilot now may act as follows:

He sets his throttle to power rating 4000 RPM, 75 HP. He leaves the throttle in this position and does not touch the throttle any more until later he will land at his destination. (Provided during the flight from departure to destination he is not disturbed by air traffic, bad whether or like.) He from thereon gives his attention only to his three rudders, side rudder, elevator(s) and aileron(s).

His craft starts to move forward on the long runway. His Propellers with the low pitch grasp the air effectively but his propeller pair with the steeper pitches are not so effective now. They are more a burden. His craft gains forward speed. Finally, after a long run with the best power range, the craft ascends from the runway and flies. Both propeller pairs may now bite at about the same efficiency. Finally his craft is reaching the cruising speed. At this forward speed of the craft, the propellers with the steeper angle are in best condition and they bite very effectively now for the long flight towards the destination. The propellers with the lower pitch are now at about "zero" angle of attack relatively to the air. They now give the smallest resistance, since they not grasp much air any more. They are merely running along without taking much power and without taking much air to drive the aircraft.

What has happened during the procedure is, that the craft runs first with effective power range towards the low pitch propeller pair and then gradially changes the rate of power to the propeller pair with the steeper angle of attack. The pilot did not do any powercontrol at all. All variations of the power rates to the different propeller pairs has happened automatically and without any action by a control means or by a pilot.

This is the major gist of the present invention, and hereon, the main claims have to be based.

The slightly more sophisticated, but possible, control at will is only an addition to the basic invention and it requires a knowledge of more sophisticated control by the pilot. Therefore, again an example of practice:

The aircraft, which the pilot intends to use has the pump means of FIG. 15. Now again, he will set his throttle to 4000 RPM and to 75 HP. Because he is energy consumption conscious.

He knows, since he has more sophisticated education, that his properller pair with the steeper pitch is a burden at start and it will increase his required runway length. Consequently, he uses the members 143,144,99 to reduce the rate of flow in portions 98 of FIG. 15. His propeller pair with the steeper pitch is now revolving slower. It uses less effective power. The power ratio may even be much smaller now than the power ratio which is going to the now more effective propeller pair with the smaller angle of attack or with the duller pitch. His craft needs now a shorter runway-length and ascends earlier. He then gradually with increasing forward speed of flight, increases the rate of flow out of portion 98 of FIG. 15 by controlling members 98,99,143,144 of FIG. 15 to a greater rate of flow (longer piston stroke). At the final flight stage of cruising speed, this portion 98 of pump 15 now supplies the main portion of the power, the greater rate of power of the 75 HP 4000 RPM to the propeller pair with the steeper angle of attack and the steeper pitch.

There could be other practical applications too. For example, the portion with two flows, th variable portion 98, of FIG. 15 could be communicated to the propeller pair with the smaller, finer, or lower angle of attack or propeller pitch. But those things are possibilities, but not the matter of the basic main gist of the invention. When too many of such possibilities, which might be added, would be given into the specification, the main gist of the invention would become more and more in danger of being misunderstood or overlooked.

It will be understood that each of the elements described above, or two or more together, may also find a useful application in other types of constructions differing from the type described above.

While the invention has been illustrated and described as embodied in a fluid-stream driven aircraft, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims:

1. A fluid-stream driven vehicle, comprising, a body having a medial longitudinal vertical plane; at least one wing extending substantially on both opposite sides of said plane; at least one pair of hydraulic fluid operated motors on portions of said vehicle; at least one pair of fluid stream creating means driven by said motors, respectively, and arranged symmetrically on opposite sides of said medial plane; at least one hydraulic fluid flow producing means having at least one pair of separate fluid-handling chamber groups of equal volumes, at least one pair of separate outlets with each one of said chamber groups connected to one outlet of said outlets, respectively, and including means for fluid-tight separation of the chambers and outlets so that fluid from an individual chamber group passes through one of said outlets only; at least one pair of displacement means associated with said fluid-handling chambers, respectively; equally acting actuator means actuating and defining the displacement volumes of said chambers, respectively, and and cooperating at equal times and in unison with said displacement means for maintaining equal movements of said displacement means so that fluid flows in said outlets at proportionate and equal rates of flow; a pair of delivery passage means connecting said outlets individually with a different one of said motors, respectively; said actuator means permanently fixed in common respective to the respective pair of said chamber groups to provide equal strokes of said displacement means of the respective pair of chamber groups; said motors containing fluid intaking chambers of equal number of chambers and equal volumes for equal numbers of revolutions at equal quantities of intake of flow of fluid; said motors having each at least one pair of ports; said ports of said motors at each pair of motors on opposite sides of said medial plane communicated vice-versa to said delivery passage means for revolving said motors of the respective pair of motors in opposite directions at equal rate of revolutions, whereby said stream-creating means on opposite sides of said medial plane are torque-balanced and driven at equal velocities for producing equal thrusts on both sides of said medial plane to stabilize the movement and attitude of said vehicle;

wherein said at least one pair of fluid stream creating means forms at least two pairs of propellers; one propeller of the same pair mounted symmetrically to the other propeller of the same pair relatively to said body;

wherein each of said propellers is driven by an individual hydraulic fluid motor and each said motor is communicated to an individual fluid line of said delivery passage means respectively, whereby the nunber of individual and separated fluid lines of said passage means are at least equal to the number of said motors;

wherein the number of said chamber groups and of said outlets is equal to the number of said motors and each outlet is singularily and exclusively communicated to a respective one of said fluid lines;

wherein said fluid lines transfer fluid under pressure from said chambers to said motors with equal flow portions to the motors of individual pairs of motors of individual pairs of said pairs of propellers;

wherein said propellers of one pair of said propellers have a first fixed pitch of propeller blades and the said propellers of another pair of said propeller pairs have a second fixed pitch of propeller blades; wherein said first pitch and said second pitch are of different angle of inclination, one thereof having a smaller pitch and the other thereof having a steeper pitch;

wherein one of said propeller pairs is effective at a lower forward speed of the vehicle and the other pair of said propeller pairs is effective at a higher forward speed of the vehicle in the response to said difference of said first and second pitches;

wherein said pressures in said fluid lines to different propeller pairs of said pairs of propellers are different at different foreward speeds of said vehicle, whereby said fluid lines to different propeller-pairs carry different portions of the power obtained from said power plant to different pairs of said propeller pairs, thereby dividing said power into different power portions supplied to different propeller pairs; and, wherein said power portions vary at different forward speeds of said vehicle to facilite economic operation of said one of said propeller pairs at said lower speed and of the other pair of said propeller pairs at said higher forward speed of said vehicle.

2. The vehicle of claim 1, wherein said vehicle is an aircraft, having a pair of wings extending in opposite directions from said body and one of said propeller pairs forms an inboard propeller pair and an other of said propeller pairs forms an outboard propeller pair, the pitches of the inboard propeller pair differ from those of the outboard propeller pair and said different portions of said power vary with different forward speed of said aircraft to increase the economy of the propeller-drive of said aircraft and to facilitate a transfer of the major portion of the said power to the propeller pair with the higher pitch of said pitches during travel of said aircraft at a higher forward speed.

* * * * *